Jan. 23, 1968   A. B. HERPOLSHEIMER   3,364,908
ROTARY CYLINDER SWINGING PISTON ENGINE
Filed Aug. 17, 1966                    2 Sheets-Sheet 1

INVENTOR.
ARTHUR B. HERPOLSHEIMER
BY
Gardner & Zimmerman
ATTORNEYS

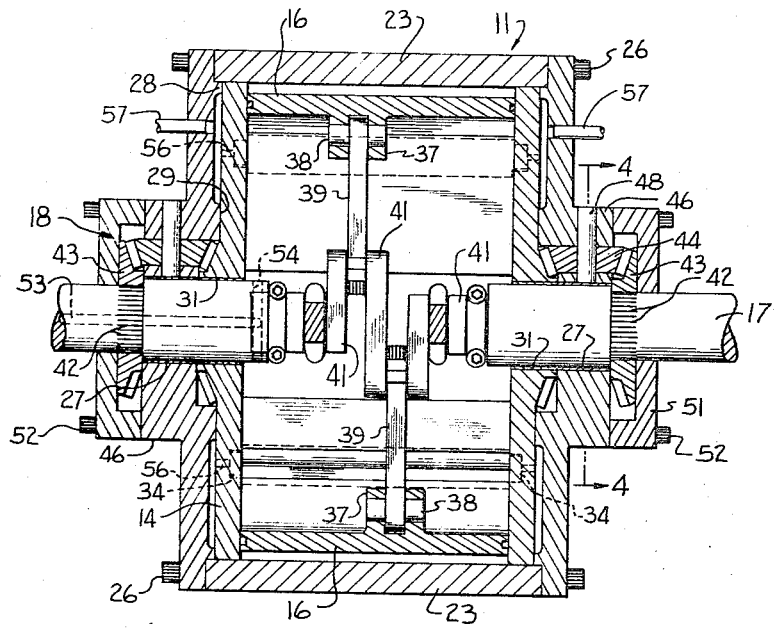

United States Patent Office 3,364,908
Patented Jan. 23, 1968

3,364,908
ROTARY CYLINDER SWINGING PISTON ENGINE
Arthur B. Herpolsheimer, 4433 San Fernando Road,
Beverly Hills, Calif. 91204
Filed Aug. 17, 1966, Ser. No. 573,032
9 Claims. (Cl. 123—17)

This invention relates to rotary internal combustion engines and, more particularly, to such an engine which is especially compact and simple in design and yet which is capable of developing a relatively large amount of power.

The principal advantages of rotary internal combustion engines are well known. Engines of this type convert the pressure of the expanding gas to rotary motion more efficiently than do reciprocating engines of the same size, and they eliminate any need for valves and their associated mechanism, timing gears, cams, cam followers, etc. However, previous rotary engines capable of producing a relatively high power have been generally too complex for acceptance.

It is therefore an object of this invention to provide a rotary internal combustion engine which is relatively simple and yet is capable of generating a high power output.

Another object of the invention is to provide a four cycle rotary engine having a low weight to power ratio and which is compact.

A further object of the invention is to provide such a rotary engine which is easy to maintain and with which conventional carburetion, ignition, exhaust, and intake systems can be used.

Still another object of the invention is to provide such a rotary four cycle engine which has an improved simple and direct means of positively imparting the rotary motion of the crankshaft to the rotor of the engine.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to such drawings:

FIGURE 3 is another cross sectional view of the engine of FIGURE 1 taken on the plane indicated by the line 3—3 of FIGURE 2; and FIGURE 4 is an enlarged sectional view taken on a plane indicated by the line 4—4 of FIGURE 3.

Figure 1:
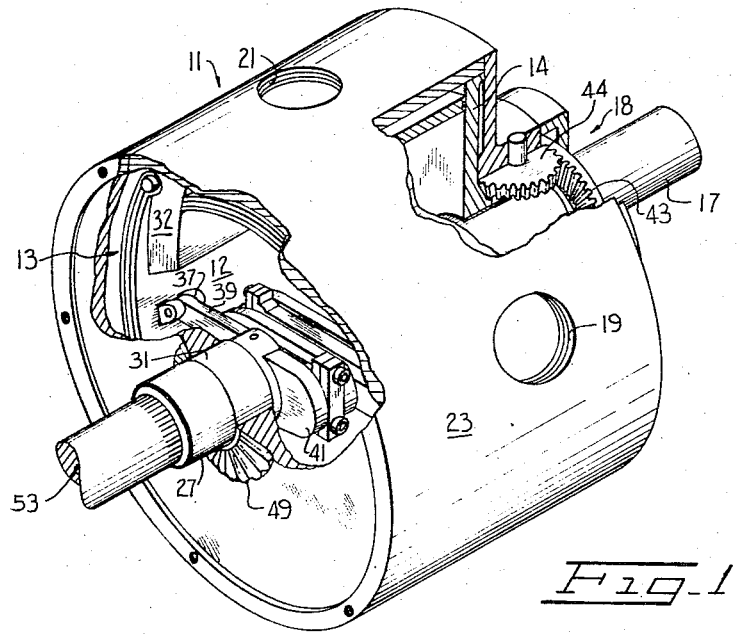
FIGURE 1 is a perspective view of a preferred embodiment of the invention showing portions thereof removed and broken away to illustrate the interior thereof.
Figure 2:
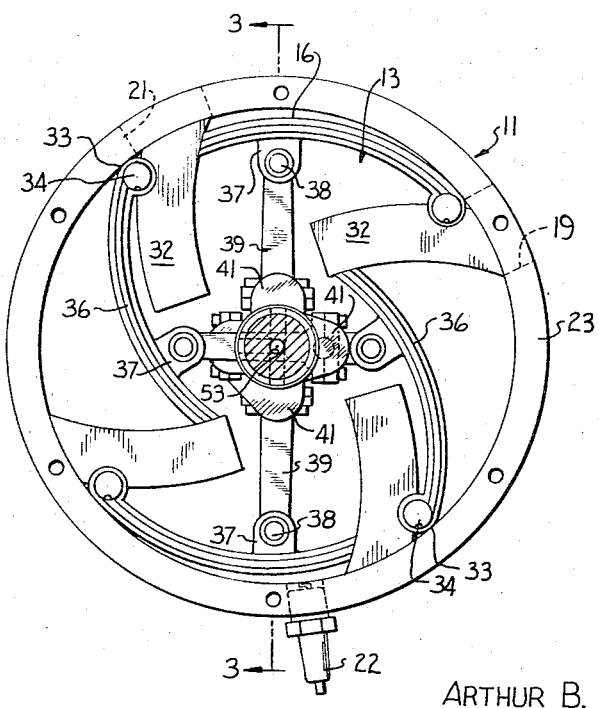
FIGURE 2 is a cross sectional view of the engine of FIGURE 1 looking along the axis of its crankshaft.

Broadly speaking, the preferred embodiment of the rotary engine depicted in the drawings is a four cycle internal combustion engine. It basically includes an exterior stationary housing 11 defining a cylindrical interior chamber 12. A rotor, generally referred by the reference numeral 13, is enclosed by chamber 12 and is adapted to rotate therewithin. Rotor 13 includes two spaced apart rotor end discs 14 (see FIGURE 3) between which are pivotally mounted a plurality of piston flapper plates 16.

As shown, each of the piston plates 16 is pivotal about an axis at one end thereof toward and away from the cylindrical walls defining the chamber. The pivotal motion of each plate changes the volume which is bordered by it, the end discs 14 and the interior chamber wall, and thereby provide the required strokes of the engine.

These plates are suitably secured in driving relation to a crankcase 17 which passes coaxially through the housing 11.

In addition, a gear train, generally referred to by the reference numeral 18, directly couples the crankshaft 17 with rotor 13 so that the rotor is driven by the crankshaft, but at a different rotation velocity than the crankshaft. Preferably, the speed of travel of the crankshaft and rotor is the same, but the rotor rotates in the direction opposite to the direction in which the crankshaft rotates.

In operation, flapper plates 16 act as pistons and, as stated before, pivotally reciprocate toward and away from the interior wall of the chamber. This reciprocal motion is caused by the plates being connected in driving relation to the crankshaft, and the crankshaft being coupled to the rotor to cause it to rotate at a different velocity. With the rotor traveling in the direction opposite to the crankshaft, but at the same speed, each plate will reciprocate twice for every one revolution of the rotor. Thus, during one revolution of the rotor, each plate will undergo the necessary reciprocations to make the rotary engine a four cycle or stroke engine. That is, during every revolution, each plate will move away from the chamber wall to draw a fuel charge into the volume between the plate and the chamber wall, reciprocate toward the chamber wall to compress the fuel charge, be forced away from the chamber wall by the combustion of the fuel charge and then again move toward the chamber wall to expel the exhaust gases. For the entry of the fuel charge and the exhaust of the expended gases, a fuel charge inlet port 19 exhaust port 21 extend through the housing and are suitably spaced around the periphery thereof. Also, a spark producing device such as spark plug 22 passes through the housing at a point at which the piston plates 16 will have the gas compressed for the power stroke. It is to be noted that while in this embodiment a spark plug is shown for igniting the fuel, the invention is also applicable to diesel engines in which the plug would be omitted.

From the above, the simplicity and compactness of the rotary engine of the invention will be readily apparent. There is a minimum of moving parts and, as will become more apparent hereinafter, conventional carburetion, exhaust and ignition systems can be easily adapted for use with the engine. Moreover, it is possible to obtain a high power output from an engine designed in accordance with the invention so that it is useful for many purposes for which heretofore rotary engines have not been practical.

Considering the invention now in more detail, the housing 11 comprises an annular shell 23 having end cover plates 24 suitably secured thereto such as by means of the bolts 26. Each of the end cover plates 24 is provided with a central opening for the passage of crankshaft 17. A stationary sleeve bearing 27 is provided within the opening and surrounding the crankshaft to facilitate rotation of the crankshaft with respect to the housing. It is to be appreciated that if it becomes necessary to have access to the interior of the engine for repairs and the like, one of the end cover plates 24 can simply be removed to expose rotor 13. FIGURE 1 depicts the engine with one of the cover plates so removed.

As best depicted in FIGURE 3, the interior surface of each end cover 24 has annular bearing ridges 28 and 29 against which the discs 14 of the rotor 13 bear. When the rotor 13 revolves at a high speed, these ridges hold it in balance and prevent it from wobbling. Each of the rotor discs 13, like each of the end cover plates 24, has an axial opening for the passage of the crankshaft 17. To permit relative rotation between the crankshaft and the rotor, a sleeve bearing 31 is provided between each of the rotor discs and the crankshaft 17.

A plurality of arcuate blocks 32 extend between the discs 14. One surface of each block 32 acts as a bearing surface for the free end of one of the piston plates and this surface of each block for a cylindrical configuration with the center line thereof being on the pivot axis of its associated piston plate. The outer end of each block 32 has a surface bearing against the interior wall surface of the housing shell 23, and its configuration generally conforms thereto. Both the interior wall surface of housing shell 23 and the block surface which bears thereagainst are desirably highly polished bearing surfaces so that a minimum of friction exists therebetween during rotation of the rotor.

As shown, the pivoted end of each flapper plate has an enlarged cylindrical portion 33 which rides within a semicylindrical groove which is adjacent the outer end of each block 32 and in the surface thereof opposite that on which the piston plate rides. The ends of the cylindrical portion 33 have reduced diameter extensions 34 which fit into corresponding sockets in the discs 14 to provide the pivot connection.

It should be apparent that as the piston plates 16 reciprocate, their side edges ride on the two rotor end discs 14, and their free end edge rides upon the arcuate surface of one of the blocks 32. The side edges and free end edge of each piston plate are therefore desirably provided with sealing inserts 36 which act as both seals and bearing surfaces for the edges. The piston plates are pivoted as closed to the interior surface of the housing shell 23 as possible, and the upper surface of each has a curved configuration generally conforming to the housing interior surface. Because of this, at the end of each outward stroke of any one of the piston plates 16, the volume defined between such piston plate and the housing is at a minimum. A relatively great compression ratio can thereby be obtained by the engine.

Two ears 37 depend from the underneath surface of each piston plate 16, and each set of ears is journalled to receive a pin 38 for the pivotal connection of a connecting rod 39 to each plate. As depicted in FIGURE 3, the four connecting rods 39 connected to the plates are at different axial positions within the engine to facilitate their connection to crankshaft 17. The crankshaft 17 has four separate cranks 41, each of which has one of the connecting rods suitably secured thereto. Cranks 41 are offset from one another 90° in the radial direction so that the reciprocal motion of the piston plates will be balanced.

As has been mentioned before, gear trains 18 are provided to directly coupled crankshaft 17 in driving a relationship to rotor 13. More particularly, each end of drive shaft 17 has a reduced diameter portion exterior to the housing cover plate 24. These reduced portions are splined at 42 for the securance of a bevel gear 43 to the crankshaft for rotation therewith. Each of the crankshaft bevel gears 43 engages three idler bevel gears 44 which are suitably mounted within an outwardly protruding boss 46 on each housing cover plate 24. That is, the boss 46 on each plate is provided with three rectangular shaped openings 47 which extend through the plate and are equally spaced in a triangular array about the axis of the crankshaft. Bevel gears 44 are secured for rotation within these openings by pins 48. The exterior surface of each of the rotor discs 13 is provided with a bevel gear 49 which is in engagement with the three idler gears 44 secured in the adjacent coverplate 24.

Due to this gear arrangement, the crankshaft will drive the rotor in a direction opposite to that of the crankshaft. Most preferably, the crankshaft gear 43 and the rotor gear 49 are provided with the same number of teeth so that the rotational speeds of the crankshaft and rotor are equal. Suitable covers 51 for the crankshaft gears 43 and idler gears 44 are secured by means of bolts 52 to the bosses 46 of each of the cover plates 24.

The depicted embodiment of the engine is both lubricated and cooled by means of oil. More particularly, one end of the crankshaft has an axial passage 53 extending from the exterior of the housing into the chamber 12. A plurality of outlet ports 54 extend radially through the crankshaft from the passage 53 for the flow of oil into the interior of the rotor 13. The oil fills the interior portion of the rotor and lubricates the crankshaft and connecting rod bearings. In this regard, it is to be noted that because of the balanced motion of the four piston plates, the volume defined in the rotor interior by these plates remains substantially the same even though the plates reciprocate. Thus there is not oil compression problem.

Because of the rotary motion of the rotor, the oil will be forced outward by centrifugal force toward the piston plates. This assures a good surface contact between the piston plates and the oil and, since the plates are relatively thin, the heat generated within the engine will pass through the plates to the oil. To leave the interior of the rotor, the oil must flow into the sockets in the rotor discs 14 in which the reduced end portions 34 of the plates are received, and thereby lubricate the pivotal mounting of the plates. From the sockets, the oil passes through passages 56 into the annular areas between each rotor disc 13 and cover plate 24. Here the oil lubricates the bearing surfaces between the discs and the cover plates before passing through outlet lines 57 which convey it to a suitable oil cooler (not shown). After being cooled the oil can be reintroduced into the axial passage 53 through the crankshaft for recirculation through the engine.

It is to be realized, of course, that other cooling systems can be provided for the engine. For example, the housing 13 could be enclosed within a water jacket, or forced air could be passed over the housing. With either of these types of cooling systems, however, the engine would have to be lubricated by some other means, for example, by a circulating or non-circulating oil system within its interior.

It will be readily appreciated from the above that no special ignition, carburetion or exhaust systems are needed for the invention. The types of such systems now in existence and utilized with conventional reciprocal engines can be easily adapted for use with the instant rotary engine.

To exemplify the high power output which can be obtained from a very compact engine of the invention, the following companion of the major parameters of a standard 1963 Chevrolet Corvair engine and an engine of the invention is presented:

Rotary engine:

(1) Four cylinders.
    (2) 4 cycle.
    (3) 110 horsepower @ 4000 r.p.m.
    (4) 64 cubic inch displacement.
    (5) 8 to 1 compression ratio.
    (6) Piston area 16 sq. in.
    (7) 4 power strokes per revolution of crankshaft.

Covair engine:

(1) Six cylinders.
    (2) 4 cycle.
    (3) 98 horsepower @ 4000 r.p.m.
    (4) 145 cubic inch displacement.
    (5) 8 to 1 compression ratio.
    (6) Piston area 9.28 sq. in.
    (7) 3 power strokes per revolution of crankshaft.

The above rotary engine has a total outer diameter of only $7^{15}/_{16}$ inches and an axial length of $5\frac{5}{8}$ inches. As shown above, this small engine has a power output in the range of that generated by conventional automobile engines.

What is claimed is:

1. A rotary engine comprising a housing defining a generally cylindrical chamber; a rotor including plurality of piston plates mounted within said chamber for simultaneous rotation in one direction about the axis of said cylinder, each of said plates being pivotally mounted for reciprocating pivoted movement toward and away from the wall of said chamber about an axis adjacent an end of said plate; a crankshaft coaxially mounted for rotation within said chamber, each of said plates having a connecting rod connected by one of its ends to the plate at a location spaced from the pivot axis thereof and by the other of its ends to a crank of said crankshaft, said crankshaft and said plates being adapted for rotation within said chamber at different rotation velocities whereby said plates will be pivoted toward and away from the wall of said chamber as said crankshaft and plates rotate; a fuel charge inlet and an exhaust gas outlet communicating with said chamber at peripheral locations which are spaced apart a distance dependent upon the differential rotation between the crankshaft and plates to provide their respective functions upon the passage thereby of each of said plates during a full revolution of each of said plates.

2. The rotary engine of claim 1 wherein a spark producing device communicates with said chamber at a peripheral location between the location of said fuel charge inlet and said exhaust gas outlet.

3. The rotary engine of claim 1 wherein said crankshaft and said plates rotate in opposite directions at equal speeds to thereby provide a four cycle engine.

4. The rotary engine of claim 3 wherein four of said piston plates are provided equally spaced about said crankshaft to thereby provide the equivalent to a four cylinder engine.

5. The rotary engine of claim 4 wherein each of the connecting rods is connected to said crankshaft at a crank which is radially displaced 90° from the cranks to which two of the other connecting rods are attached whereby the reciprocal motion of the piston plates will be balanced.

6. The rotary engine of claim 3 wherein said rotor includes two discs between which are pivotally mounted said piston plates and which are adapted to rotate with said plates about said crankshaft, and a gear train is provided interengaging said rotor with said crankshaft to provide said opposite rotation at equal speeds.

7. The rotary engine of claim 6 wherein said gear train comprises a first bevel gear on one of said discs coaxially of said crankshaft, a second bevel gear on said crankshaft facing said first bevel gear, and an idler bevel gear between and interengaging said first and second gears, said first and second gears having an equal number of teeth.

8. The rotary engine of claim 1 wherein four of said piston plates are provided equally spaced about said crankshaft and said rotor includes two spaced apart coaxial discs between which said piston plates are mounted, each of the connecting rods is connected to said crankshaft at a crank which is radially displaced 90° from the cranks to which two of the other connecting rods are attached, and a gear train interengages said rotor and said crankshaft to rotate said rotor in the opposite direction of said crankshaft and at the same speed, said gear train comprising a first bevel gear on one of said rotor discs coaxially of said crankshaft, a second bevel gear on said crankshaft facing said first bevel gear, and an idler bevel gear between and interengaging said first and second gears.

9. The rotary engine of claim 8 wherein said rotor further includes four blocks extending between said discs and equally spaced radially about said crankshaft between said piston plates, each of said blocks having a cylindrical surface on which the free end of an associated one of said piston plates is adapted to ride during the reciprocal pivotal movement thereof.

References Cited

UNITED STATES PATENTS

| | | | |
|---|---|---|---|
| 1,209,204 | 12/1916 | Richards | 123—17 |
| 1,360,353 | 11/1920 | Ballerstedt | 91—147 XR |
| 1,549,015 | 8/1925 | McCarthy | 123—17 |
| 1,605,912 | 11/1926 | Barker | 123—17 |
| 1,715,490 | 6/1929 | Ballerstedt | 91—147 |
| 2,081,812 | 5/1937 | Hapkins | 91—147 |
| 2,121,660 | 6/1938 | Hammers | 123—17 |

WENDELL E. BURNS, *Primary Examiner.*